United States Patent Office 3,165,619
Patented Jan. 12, 1965

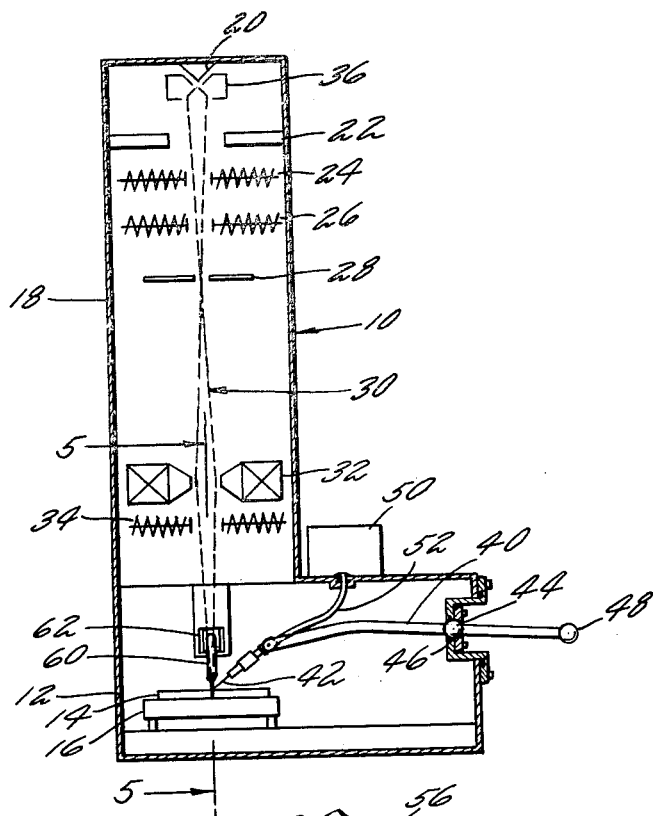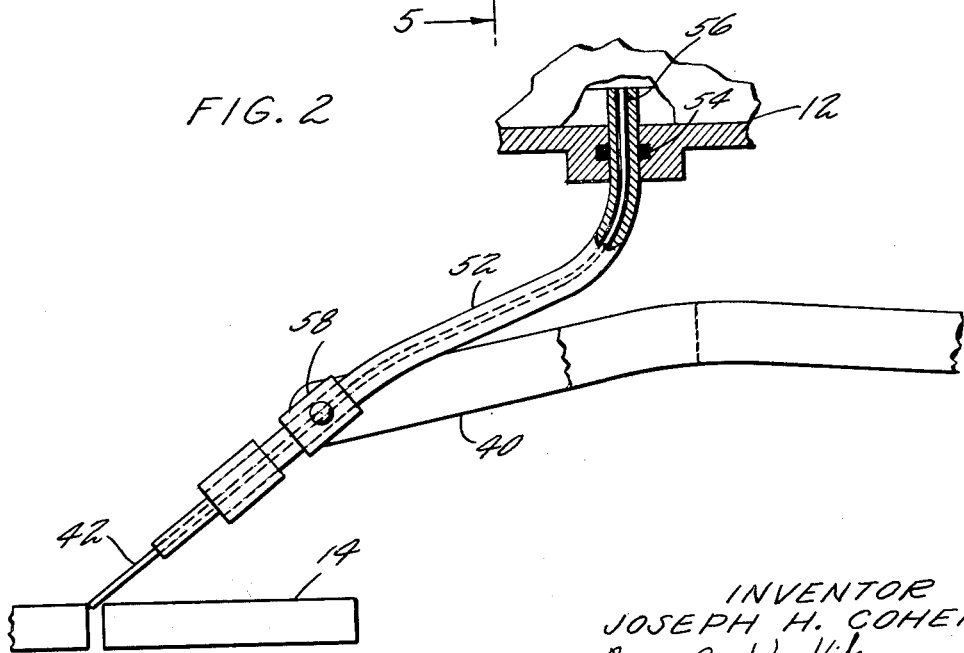

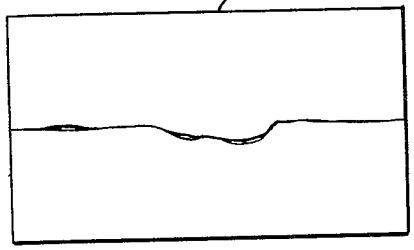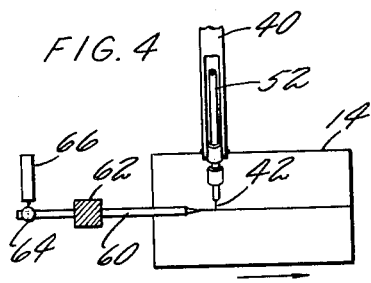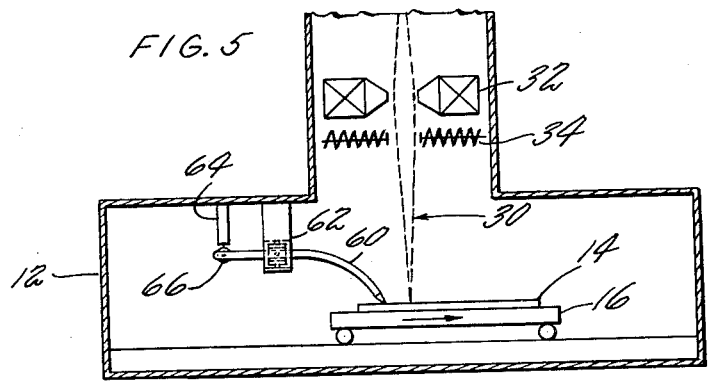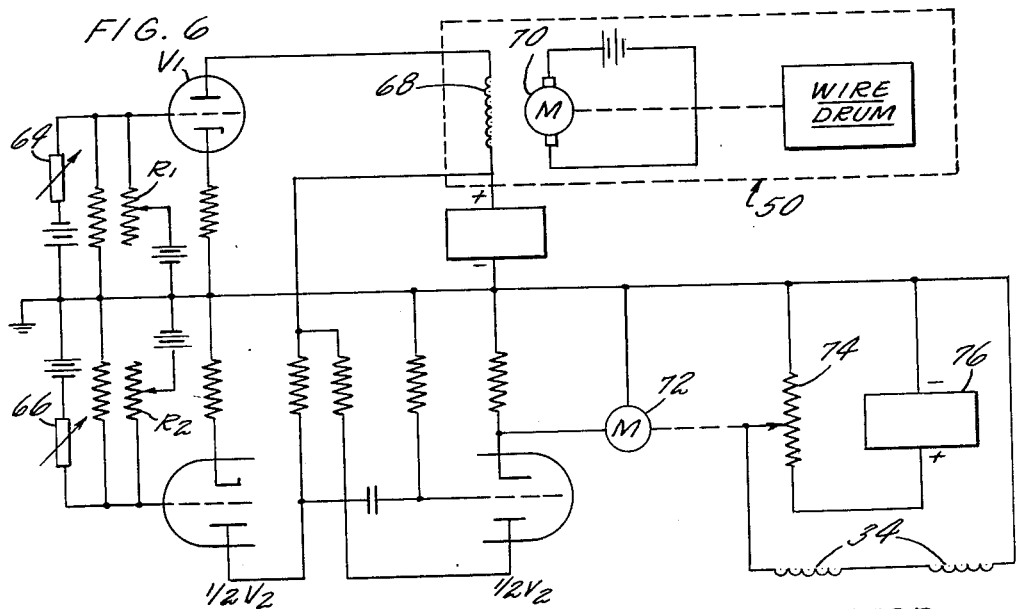

3,165,619
OPERATING CONTROL FOR ELECTRON
BEAM MACHINES
Joseph H. Cohen, West Hartford, Conn., assignor to
United Aircraft Corporation, East Hartford, Conn., a
corporation of Delaware
Filed Aug. 15, 1962, Ser. No. 217,136
6 Claims. (Cl. 219—121)

My invention relates to working materials with an intense beam of charged particles. More particularly, my invention relates to sensing a plurality of parameters of a workpiece and utilizing the information thus sensed to maintain the desired conditions at the point of beam impingement on such workpiece.

My invention has particular utility when used with an electron beam machine. Electron beam machines, as they are generally known, are devices which use the kinetic energy of an electron beam to work a material. U.S. Patent No. 2,987,610, issued June 6, 1961, to K. H. Steigerwald, discloses such a machine. These machines operate by generating a highly focused beam of electrons. The electron beam is a welding, cutting and machining tool which has practically no mass but has high kinetic energy because of the extremely high velocity imparted to the electrons. Transfer of this kinetic energy to the lattice electrons of the workpiece generates higher lattice vibrations which cause an increase in the temperature within the impingement area sufficient to accomplish work. In fact, the temperature becomes so high that the material melts and even evaporates. This evaporation, in turn, permits deep penetration of the workpiece by the beam. That is, deep penetration can only be achieved by evaporation of a fine channel in the material.

In performing work such as welding with an electron beam, the optimum operating or welding conditions are those which enable deep penetration, prevent voids in the weld region, and insure that no more than the necessary area of the work will be affected by the beam. The depth of penetration is a function of the beam power density and the type and thickness of the material to be worked. Beam power density is defined as:

(1) $$D = iV/A$$

where
$i$ = beam current
$V$ = electron acceleration voltage
$A$ = spot size or area of beam impingement on the work From Equation 1 it can be seen that once the electron acceleration voltage, current and spot size have been adjusted for the required beam power density for the particular material to be worked, one of the optimum working conditions can be satisfied by keeping the beam focused to the selected spot size at the workpiece. It is also necessary, as mentioned above, under optimum conditions, to control the position of beam impingement on the workpiece so that only the desired region is affected by the beam. In welding operations, a third factor to be considered in determining whether an optimum weld will be obtained is the size of the gap between the two pieces to be welded. The gap dimensions should control the amount of a filler wire to be supplied to the weld area where it is melted and fuses the joint thereby preventing voids.

Consider, for purposes of explanation, a butt welding operation as performed with an electron beam machine. After the workpiece is positioned in the path of the beam, the beam is focused at one end of the joint to be welded and the beam power density adjusted to the desired value. Then, the beam and the workpiece are moved relative to each other thereby causing the beam to move along the joint while making the weld. In prior art electron beam welding machines, if the joint to be welded was other than a straight line, an operator visually observing the welding operation would have to manually control the point of beam impingement on the workpiece so as to make the beam follow the joint. This could be done by three methods, all of which are relatively slow and inaccurate and are thus unsatisfactory. First, the beam could be deflected in a direction perpendicular to the above-mentioned direction of relative motion by the operator's manual adjustment of the beam deflection voltage. Secondly, the electron gun could be physically displaced in said perpendicular direction by activating electromechanical driving means. Thirdly, the actual position of the workpiece could be varied by controlling the position of a movable table carrying the workpiece.

A second problem tending to prevent maintenance of optimum welding conditions in prior art electron beam welders results from the fact, as mentioned above, that under circumstances where the two pieces to be butt welded do not fit together firmly a gap will be left. In order to weld such pieces it is necessary to sweep the beam back and forth across the gap during the above mentioned relative motion. However, this in itself may not be sufficient to prevent voids and produce uniform joint strength and appearance. In the arc welding art this problem is overcome by feeding a filler wire into the arc as the weld is being made. Prior art electron beam welders have been unsuccessful in attempting this approach because the welding in such machines is usually performed in a vacuum chamber and thus difficulties are presented in feeding the filler wire into the vacuum without a coincident leakage of air thereto. Further difficulty is presented in controlling the position and rate of feed of the wire inside the vacuum chamber.

A third hindrance to maintaining optimum welding conditions, previously unsolved in the electron beam welding art, arises when the piece to be worked has other than a flat surface. As mentioned above, in order to have deep penetration and thus a strong weld, the electron beam must be precisely focused at the workpiece. If the height of the workpiece varies, the beam focus point must correspondingly vary if a uniformly strong weld is to be obtained. In the prior art, the only methods for varying the beam focus point during operation of the machine were to manually adjust the current to the magnetic lens which focuses the beam or to raise and lower the electron gun while the work was being observed visually. It has been suggested that, knowing the contour of the workpiece, both beam focus and deflection might be programmed by means known in the computer arts. This, however, requires expensive and complicated apparatus, precise measuring of the workpiece and exact initial positioning of the workpiece in the electron beam machine's vacuum chamber. It has also been suggested that beam focus and deflection might be controlled by use of a template tracer. However, this method requires precise duplication of the workpiece and presents all the other problems incident to programming the operation.

My invention overcomes the above disadvantages of the prior art by providing apparatus which senses a plurality of parameters of a workpiece and utilizes the thus sensed parameters for affecting changes in the operating conditions at the point of beam impingement on such workpiece.

It is, therefore, an object of my invention to sense a plurality of parameters of a piece to be worked with a beam of charged particles.

It is also an object of my invention to sense a plurality of parameters of a part to be worked with a beam of charged particles and to utilize the thus sensed parameters to control the working conditions at the point of beam impingement on said part.

It is yet another object of my invention to automatically control the point of impingement of a beam of charged particles in response to a sensed parameter of a piece to be worked by said beam.

It is a further object of my invention to automatically control the point of impingement and focusing of a beam of charged particles in response to sensed parameters of a piece to be worked by said beam.

It is still another object of my invention to automatically control the point of impingement and rate of feed of a filler wire to said point of impingement of a beam of charged particles in response to sensed parameters of a piece to be worked by said beam.

It is another object of my invention to feed a filler wire into a vacuum chamber and to control the position of the wire in said chamber without affecting the vacuum.

It is also an object of my invention to provide uncomplicated and inexpensive apparatus that will accomplish the other objects of my invention.

These and other objects of my invention are accomplished by providing novel apparatus for tracking the desired point of impingement on a workpiece of a beam of charged particles and for controlling the deflection of the beam and either the focusing of the beam or the rate of feed of a filler wire to the point of beam impingement in response to sensed variations in the contour and position of said desired impingement point.

My invention may be better understood and its numerous advantages will become apparent to those skilled in the art by reference to the accompanying drawing in which like reference numerals apply to like elements in the various figures and in which:

FIGURE 1 shows an electron beam machine having my invention included therein.

FIGURE 2 is a partial view of the filler wire feed means of my invention.

FIGURE 3 is a top view of a workpiece which could be butt welded using my invention.

FIGURE 4 is a top view of the means for sensing parameters of the workpiece and of the means for feeding filler wire to the beam impingement point of my invention.

FIGURE 5 is a cross-section view along line 5—5 of FIGURE 1 showing the means for sensing parameters of the workpiece of my invention.

FIGURE 6 is a schematic drawing of circuitry for automatically controlling beam impingement point and filler wire feed rate in response to sensed workpiece parameters in accordance with my invention.

Figure 7:
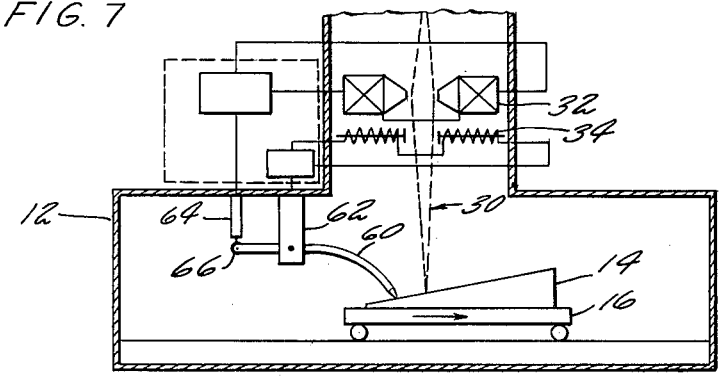
FIGURE 7 is a cross-section view along line 5—5 of FIGURE 1 showing the means for sensing the parameters of the workpiece and automatically controlling beam impingement point and focus in accordance with my invention.

Referring now to FIGURE 1 an electron beam machine is indicated generally as 10. The machine comprises a vacuum chamber 12 containing a workpiece 14 positioned on a movable table 16. It should be noted that, by means known in the art, the workpiece may be located outside of the vacuum chamber and the beam brought out of the vacuum. The machine also comprises an electron beam column 18 containing a source of electrons, beam forming means and beam focusing means. The source of electrons comprises a directly heated cathode 20 which is supplied with heating current from a filament voltage supply, not shown. An accelerating voltage is applied to cathode 20 from a source, not shown, of adjustable high negative direct current voltage. An apertured anode 22 is positioned in the electron beam column 18 between the cathode and the workpiece. The anode is connected to the case of the machine which is grounded. The difference in potential between cathode 20 and anode 22 causes electrons emitted from the cathode to be accelerated down column 18. The electrons are focused into a beam, indicated generally at 30, by an electron optical system comprising adjustment coils 24 and 26, diaphragm 28 and magnetic lens 32.

The beam impinges on workpiece 14 where it gives off kinetic energy in the form of heat. The workpiece 14 may be moved beneath the beam by movable table 16 and the beam may be deflected over the workpiece by means of deflection coils 34, only one pair of which are shown in FIGURE 1. Positioned adjacent cathode 20 is a control electrode 36. This electrode may be of the Wehnelt cylinder type such as disclosed in U.S. Patent No. 2,771,568, issued November 20, 1956, to K. H. Steigerwald. This control electrode is normally maintained at a voltage which is more negative than the voltage applied to the cathode. The magnitude of this bias or voltage difference controls the beam current in the same manner as the grid in an ordinary vacuum tube controls triode plate current.

Also positioned in vacuum chamber 12 is novel apparatus constituting part of my invention which permits the feeding of a filler wire to the point of beam impingement when a welding operation is to be performed with machine 10. This apparatus comprises a guide rod 40 which controls the positioning of a flexible filler wire feeder guide tube 52. Guide rod 40 extends through the wall of vacuum chamber 12 so that the machine operator can manipulate the position of contact of the filler wire 42 with the gap by manually rotating the outer end of the rod 40 in any direction. This rotation is permitted by ball joint 44, located in the wall of the vacuum chamber 12, which facilitates multiplane motion. Leakage of air into the vacuum around ball joint 44 is prevented by sealing ring 46. Thus, by utilizing the outer end of the rod 40 as a lever, the filler wire 42 can be made to follow the gap regardless of the contour of the work. A second sealing ring may be used on the inside of the ball 44 where rod 40 passes therethrough to permit extending or retracting the rod. The outer end of rod 40 has a rotatable control handle 48 affixed thereto which may be mechanically connected to a rheostat and appropriate electrical circuitry to permit manual control of the wire feed rate by the operator as he observes the operation. Wire feed rate is determined by the speed of a feed drive motor located outside of the vacuum chamber in a unit 50. Unit 50 contains a spool of filler wire and a filler wire feed drive motor which pushes the wire 42 down the flexible filler wire feeder guide tube 52 to the weld region. Locating unit 50 outside of the vacuum chamber permits easy accessibility, a smaller vacuum chamber and the bulk of the equipment does not have to be adapted for vacuum operation.

FIGURE 2 shows a partial cross-sectional view of the filler wire feed means. As can be seen from FIGURE 2, the flexible tube 52 passes through the outer wall of vacuum chamber 12. A ring seal 54 prevents leakage of air into the vacuum chamber around the exterior of tube 52. Another sealing ring 56 on the interior of tube 52 prevents leakage of air around the filler wire. As described above, the position of flexible tube 52 is controlled by guide rod 40 which has a bifurcated end which is pivotably attached to a collar 58 surrounding tube 52. Thus, filler wire 42 may be accurately positioned at any point along the joint to be welded by the operator's rotating, extending or retracting guide rod 40. Additional control may be achieved by regulating the amount of filler wire extending beyond the end of flexible tube 52. As shown in FIGURE 2, the filler wire 42 is fed from the side of the joint. However, the filler wire may also be arranged to be fed parallel to the joint for joints requiring a uniform amount of filler material per unit length.

In many cases not only will there be a variable width gap between two pieces to be butt welded but the gap will also deviate from a straight line. FIGURE 3 shows a workpiece 14 where both of these conditions exist. Since the focused beam in an electron beam machine may be of the order of .001 inch in diameter, the beam must be caused, in some manner, to move from side to side so as to follow even slight deviations in a straight line path of the joint as either the table 16 causes the workpiece to move beneath the beam or the beam is deflected in one direction across the workpiece by means of a first pair of diametrically opposed deflection coils. Therefore, my invention also contemplates apparatus for tracking the seam to be welded and for generating control signals in response to deviations of the seam from a straight line. These control signals may be used to control the deflection of the beam, as in the preferred embodiment, or to position a movable electron gun of the type used in less sophisticated machines. A side view of this tracking apparatus is shown in FIGURE 5 while FIGURE 4 shows a top view of the filler wire feeder and the tracking apparatus. The tracking apparatus comprises a probe 60 having a tip thereon of suitable size and shape so as to travel along in or follow the joint as the workpiece moves. As shown in FIGURE 5, the probe engages the joint a short distance ahead of the beam impingement point. Probe 60 is mounted on an anti-friction bearing gimbal assembly 62 which is supported from the top of vacuum chamber 12. Gimbal assembly 62 permits probe 60 to rotate about horizontal and vertical axes. Thus, as the gap widens the tip of probe 60 will drop down further therein and the probe will thus rotate about the horizontal axis of gimbal 62. As the joint moves left or right of a central position, the probe will rotate about the vertical axis of the gimbal assembly. Attached to the opposite ends of the probe are a pair of linear transducers 64 and 66 which, in my preferred embodiment, are of the variable resistance type. Rotation of probe 60 about its horizontal and vertical axes will cause a change in the resistance of transducers 64 and 66 respectively. These resistance changes are converted into electrical signals which may be used to control beam deflection and either filler wire feed rate or beam focus point or both of the latter by using suitable combinations of transducers.

Referring now to FIGURE 6 there is shown electrical circuitry adapted for use with the apparatus of FIGURE 5. Upon rotation of probe 60 about the horizontal axis of gimbal 62, in response to variations in gap width, the resistance of transducer 64 will either increase or decrease. An increase in the gap width will cause a decrease in the resistance of transducer 64. This change in resistance will cause the bias voltage on triode V1 to increase in a negative direction thereby causing a corresponding decrease in the plate current of the triode. Since the plate current of tride V1 flows through the field winding 68 of D.C. shunt motor 70 of unit 50, the decrease in the resistance of transducer 64 will cause a corresponding decrease in the field current of motor 70 and the motor will thus speed up. An increase in speed of motor 70, which drives the filler wire drum, will cause the required increase in filler wire feed rate to compensate for the increased gap width. Rheostat R1, which is connected in parallel with transducer 64, will permit setting the bias and thus the plate current of V1 so as to obtain a desired initial filler wire feed rate. Variations in the resistance of transducer 64 will cause a portion of the voltage from its associated voltage source to be subtracted from the bias voltage on triode V1 as set by rheostat R1.

A change in the resistance of linear transducer 66 caused by deviation from a straight line of the joint will cause generation of a control signal in much the same manner as discussed above in relation to transducer 64. These signals are amplified by the two sections of triode V2. The second stage of this amplifier functions as a cathode follower to supply a control voltage to servo-motor 72. A change in the shaft position of motor 72 will change the position of the movable arm of potentiometer 74. Potentiometer 74 is connected across a deflection voltage supply 76. The movable arm on potentiometer 74 is connected to a second pair of deflection coils 34 of the electron beam machine which are arranged so as to cause beam deflection in a direction transverse to the direction of motion of the movable table 16 or to the direction of deflection caused by the above-mentioned first pair of deflection coils. Thus, a change in the resistance of transducer 66, indicative of a change in the position of the joint, will cause a corresponding change in the shaft position of motor 72 and, consequently, a corrective change in the deflection voltage which will move the beam impingement point the required distance to the left or right so that the beam will always strike the workpiece at the joint. Rheostat R2 permits adjustment of the bias on the first stage of the dual-triode V2 such that the movable arm on potentiometer 74 will be positioned so as to cause the electron beam to be centered at the start of a welding pass.

Figure 8:
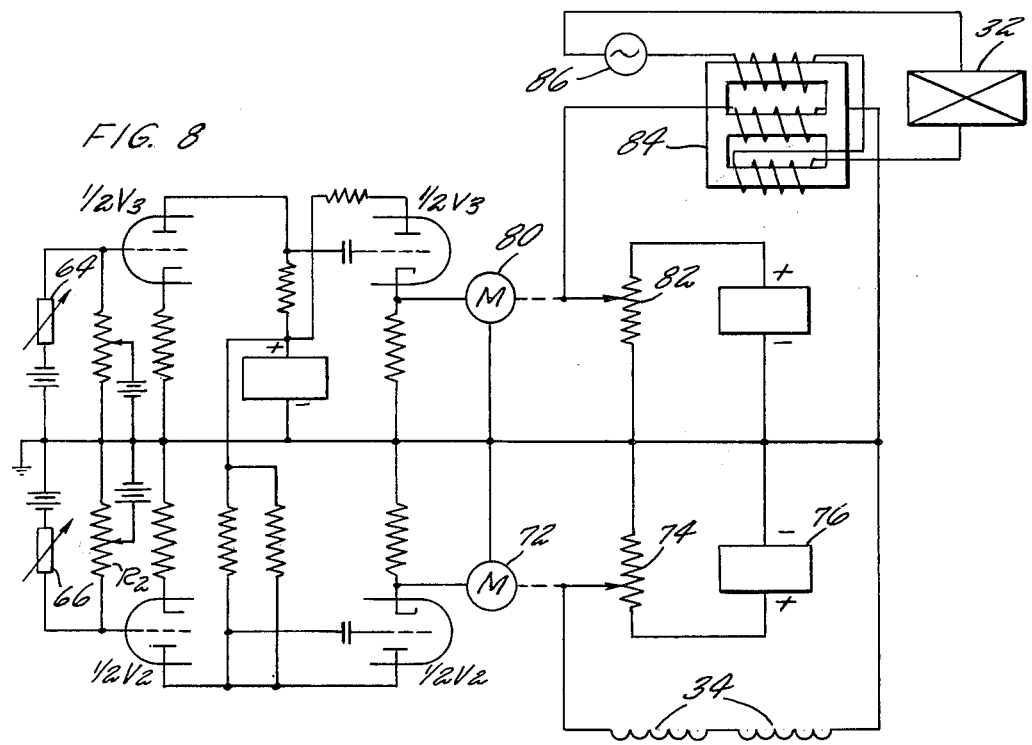
FIGURE 8 is a schematic drawing of circuitry that may be utilized in the apparatus of FIGURE 7 to accomplish the automatic control feature of my invention.

Referring now to FIGURE 7 there is shown an embodiment of my invention which is utilized when the workpiece 14 itself varies in height. The seam tracker functions in the same manner as described above with exception that means such as a flat disc are provided on the end of the seam tracker to prevent the tip of probe 60 from dropping further into the gap should the gap widen. The apparatus of FIGURE 7, like the apparatus of FIGURES 5 and 6, controls the deflection of the beam so that it always impinges upon the joint to be welded. However, unlike the previous embodiment, the apparatus of FIGURE 7 controls the beam focus point, rather than the filler wire feed rate, so that the beam is always focused at the workpiece regardless of its height. However, with the addition of suitable transducers and circuitry, both filler wire feed rate and beam focus point may be controlled. The circuitry for accomplishing the foregoing is disclosed in FIGURE 8. In FIGURE 8 the deflection voltage control circuit is the same as that described in relation to FIGURE 6. However, linear transducer 64 is used to develop a control signal for magnetic lens current control. The signal developed by change in resistance of transducer 64 is amplified by the two stages of dual-triode V3, the second stage of which functions as a cathode follower, and is used to control the shaft position of a servo-motor 80. Motor 80 in turn controls the position of the movable arm of potentiometer 82 and thus controls the D.C. current supplied to a saturable reactor 84. As is well known in the art, the D.C. current supplied to reactor 84 will control the current supplied by an A.C. source 86 to magnetic lens 32 through the reactor. Thus an increase or decrease in the resistance of transducer 64 will cause a corresponding change in the current to magnetic lens 32 and the beam will be continuously refocused so as to have its focus point at the workpiece regardless of its height.

It should be noted that, when the embodiment of FIGURES 7 and 8 is employed, the filler wire feed rate may still be manually controlled by the operator by manipulation of control handle 48 of guide rod 40, in the manner discussed above, as he visually observes the work. Also, it would be within the capabilities of one skilled in the art to provide a separate tracker and transducer means for gap width monitoring so as to automate the entire process.

While a preferred embodiment has been shown and described, various modifications and substitutions may be made without deviating from the scope and spirit of my invention. For example, while my invention has primary utility when used with an electron beam machine, it would be equally applicable to devices utilizing other forms of energy which may be focused or deflected. Also, while my invention has been explained in terms of welding in

I claim:

1. Apparatus for working materials with an intense beam of charged particles comprising:

means for generating an intense beam of charged particles, means for causing said beam to impinge against a workpiece positioned generally in the path thereof, means for causing relative movement between said beam and the workpiece in a first direction, means for continuously tracking the desired point of beam impingement on the workpiece during the relative movement between the beam and the workpiece in a first direction, first transducer means responsive to said tracking means for producing signals corresponding to the position in a horizontal plane of the desired beam impingement point, second transducer means responsive to said tracking means for producing signals corresponding to a parameter of the workpiece as indicated by the position of said tracking means in a vertical plane through the desired beam impingement point, means responsive to the horizontal position signals generated by said first transducer means for causing relative movement between said beam and workpiece in a second direction perpendicular to the direction of said first relative movement whereby the beam is caused to follow a path on the workpiece defined by the desired beam impingement point, and means responsive to the signals produced by said second transducer means for varying the focus of the beam whereby the desired beam diameter is maintained at the workpiece.

2. Apparatus for working materials with an intense beam of charged particles comprising:

means for generating an intense beam of charged particles, means for causing said beam to impinge against a workpiece positioned generally in the path thereof, means for causing relative movement between said beam and the workpiece in a first direction, means for continuously tracking the desired point of beam impingement on the workpiece during the relative movement between the beam and the workpiece in a first direction, first transducer means responsive to said tracking means for producing signals corresponding to the position in a horizontal plane of the desired beam impingement point, second transducer means responsive to said tracking means for producing signals corresponding to a parameter of the workpiece as indicated by the position of said tracking means in a vertical plane through the desired beam impingement point, means responsive to the horizontal position signals generated by said first transducer means for causing relative movement between said beam and workpiece in a second direction perpendicular to the direction of said first relative movement whereby the beam is caused to follow a path on the workpiece defined by the desired beam impingement point, means for feeding a filler wire to the point of beam impingement, and means responsive to the signals produced by said second transducer means for controlling the rate at which the filler wire is fed to the beam impingement point.

3. Apparatus for welding materials with a beam of charged particles comprising:

means for generating a beam of charged particles, means for causing said beam to impinge upon a workpiece positioned generally in the path thereof, means for causing relative movement between said beam and the workpiece in a first direction, means movable about two axes for continuously tracking a seam to be welded on the workpiece, first transducer means responsive to movement of said tracking means about a vertical axis for producing signals indicative of the position in a horizontal plane of the seam, second transducer means responsive to movement of said tracking means about a horizontal axis for producing signals indicative of a condition of the seam as indicated by the vertical position of said tracking means, and means responsive to the signals produced by said transducer means for effecting changes in the welding conditions at the seam during the welding operation.

4. The apparatus of claim 3 wherein the means for affecting changes in the welding conditions comprises:

means responsive to the horizontal position signals produced by said first transducer means for causing the beam impingement point to be varied in a direction perpendicular to the direction of relative motion whereby the beam is caused to follow the joint, and means responsive to the vertical position signals produced by said second transducer means for varying a welding condition at the beam impingement point.

5. The apparatus of claim 4 wherein the means for varying a welding condition comprises:

means responsive to signals produced by said second transducer means for varying the focus point of said beam whereby the beam is maintained focused at the surface of the workpiece.

6. The apparatus of claim 4 wherein the means for varying a welding condition comprises:

means for feeding a filler wire to the point of beam impingement, and means responsive to signals produced by said second transducer for controlling the rate at which the filler wire is fed into the joint during the welding operation whereby the rate of filler wire feed is controlled by the width of the joint being welded.

References Cited by the Examiner

UNITED STATES PATENTS

| | | | |
|---|---|---|---|
| 2,189,399 | 2/40 | Lewbers | 219—124 |
| 2,679,622 | 5/54 | Deri | 318—31 |
| 2,766,414 | 10/56 | Jessey et al. | 318—31 |
| 2,839,663 | 6/58 | McCollom | 219—76 |
| 2,948,840 | 8/60 | Haldemann et al. | 318—31 |
| 2,971,079 | 2/61 | Sommeria. | |
| 2,987,610 | 6/61 | Steigerwald. | |
| 2,989,614 | 6/61 | Steigerwald. | |

RICHARD M. WOOD, *Primary Examiner.*

JOSEPH V. TRUHE, *Examiner.*